2,790,784
POLYMERIZATION OF ACRYLONITRILE IN THE PRESENCE OF ESTER-AMIDE POLYMERS

Harry W. Coover, Jr., and Joseph B. Dickey, Kingsport, Tenn., assignors to Eastman Kodak Company, Rochester, N. Y., a corporation of New Jersey No Drawing. Application October 21, 1952, Serial No. 316,052

16 Claims. (Cl. 260—45.5)

This invention relates to the polymerization of acrylonitrile in the presence of ester-amide polymers, and to articles obtained therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of the polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that stable solutions of acrylonitrile polymers, which do not separate into distinct layers on standing, and from which fibers of good dyeability can be spun, can be prepared by polymerizing acrylonitrile in the presence of certain ester-amide polymers, i. e. polymers of the ester-amides of maleic, fumaric, itaconic and citraconic acids. These fibers are characterized by a softening point higher than that of the interpolymers referred to above, and do not exhibit the segmentation defect shown by many of the fibers prepared from certain prior art mixtures comprising polyacrylonitrile. Fibers prepared according to our invention also have a softening point higher than fibers prepared from simple interpolymers of acrylonitrile and alkenyl carbonamides obtained according to the method of Jacobson et al. U. S. Patent 2,311,548, dated February 16, 1943, for example.

It is, therefore, an object of our invention to provide acrylonitrile polymer compositions. A further object of our invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent from a consideration of the following description and examples.

According to our invention, we prepare the resinous compositions or polymers of our invention by polymerizing acrylonitrile monomer in the presence of homopolymers or interpolymers of certain half-ester amides of maleic, fumaric, itaconic and citraconic acids, i. e. maleamates, fumaramates, itaconamates and citraconamates. The resinous compositions of the invention contain from 5 to 95 percent by weight of acrylonitrile and from 95 to 5 percent by weight of the isolated homopolymer or interpolymer. Those of our compositions which contain from 60 to 95 percent by weight of acrylonitrile have been found to be especially useful as fiber-forming materials. However, all of our compositions in the 5 to 95 percent range of acrylonitrile are compatible with each other, with polyacrylonitrile or with other acrylonitrile polymers containing at least 85 percent by weight of acrylonitrile, in all proportions, but the most useful mixtures comprise from 5 to 95 parts by weight of one or more of the polymers of the invention with from 95 to 5 parts by weight of polyacrylonitrile. Monomers, whose polymers were not heretofore compatible with polyacrylonitrile can thus be polymerized according to our invention to give polymers which are highly compatible with polyacrylonitrile.

It is known that acrylonitrile can be polymerized in the presence of certain polymeric emulsifying agents such as polyacrylamides, Jacobson U. S. Paten 2,354,210, dated July 25, 1944. The amounts of dispersing agents employed in such polymerizations are small, and generally do not exceed 1 or 2 percent by weight, based on the materials being polymerized. Such small amounts of polyamides have little or no beneficial effect, insofar as increasing the dyeability of fibers obtained from the resulting polymer products is concerned.

We have found that the preformed homopolymers are particularly useful in practicing our invention. However, interpolymers of the mentioned half-ester amides can also be used to advantage. Such interpolymers contain from 5 to 95 percent by weight of the half-ester amide and from 95 to 5 percent by weight of a monoethylenically unsaturated, polymerizable organic compound containing a

I       —CH=C< group, or more especially a

II       CH₂=C< group. The preformed homopolymers and interpolymers can be prepared by polymerizing the mentioned half-ester amides alone or in admixture with the other and different monomer according to methods well known to the art.

The maleamates which can advantageously be used in our invention are selected from those represented by the following general formula:

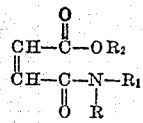

wherein R and $R_1$ each represents a member selected from the group consisting of a hydrogen atom and an alkyl group containing from 1 to 4 carbon atoms and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those represented by the following general formula:

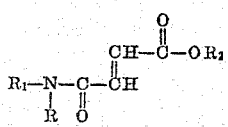

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those represented by the following general formula:

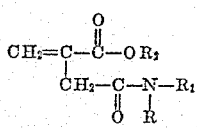

and

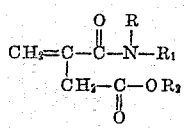

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-methyl ethyl itaconamate, N-dimethyl n-butyl itaconamate, the N-dibutyl methyl itaconamates, etc.

As citraconamates, we can advantageously use those represented by the following general formula:

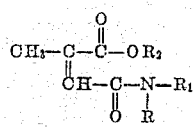

and

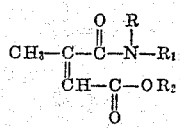

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The monoethylenically unsaturated compounds represented by Formulas I and II, whose interpolymers are useful in practicing our invention, comprise the maleamates, fumaramates, itaconamates and citraconamates above set forth as well as methyl acrylate, ethyl acrylate, N-propyl acrylate, isopropylacrylate, n-butyl acrylate, isobutyl acrylate, methyl methacrylate, ethyl methacrylate, n-propyl methacrylate, isopropyl methacrylate, n-butyl methacrylate, isobutyl methacrylate (e. g. alkyl acrylates containing from 1 to 4 carbon atoms in the alkyl group), vinyl acetate, vinyl propionate, styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinyl-phthalimide, ethylene, maleamides, vinyl fluoride, perfluoroethylene, vinylpyridines, acrylamides, fumaramides, itaconamides, citraconamides, etc.

The polymerization is advantageously carried out in an aqueous medium, although other reaction media, such as organic solvents, can be employed; for example, a polymerization medium consisting of aqueous acetone, or other aqueous solvent can be used.

The polymerization can be accelerated by the use of a well known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc.). Other catalysts such as the ketazines, azines, etc. can be used. The quantity of catalyst used can be varied, depending on the monomer, amount of diluent, etc.

The temperatures at which the process of our invention can be carried out vary from ordinary room temperature to the reflux temperature of the reaction mixture. Generally a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The half-ester amide homopolymer or interpolymer can advantageously be suspended in an aqueous medium containing the polymerization catalyst, and the suspension (or solution) heated for a time (e. g. 30 minutes to 24 hours) prior to the addition of the acrylonitrile, and the mixture then subjected to polymerizing conditions. Alternatively, the polymer of the half-ester homopolymer or interpolymer can be added to an aqueous mixture (solution or emulsion) containing the acrylonitrile and polymerization catalyst, and the mixture then subjected to polymerizing conditions. The acrylonitrile and the homopolymer or interpolymer can be first mixed together, and the mixture added to an aqueous medium containing a polymerization catalyst.

The following examples will serve to illustrate further the manner whereby we practice our invention.

Example No. 1

2 grams of polyfumaramide were dissolved in 100 cc. of water containing 0.1 gram of ammonium persulfate, 0.1 gram of potassium bisulfate and 8 grams of acrylonitrile. The resulting solution was allowed to polymerize for 16 hours at 25° C. and the resulting polymer was filtered off. After drying, there was obtained a product weighing 8.7 grams. It was found to contain 19 percent by weight of fumaramide on analysis.

The polymers can be mixed with polyacrylonitrile in all proportions and dissolved to give stable solutions which do not separate into distinct layers on standing and from which fibers and films of homogeneous character can be spun, extruded or cast. The fibers obtained by preparing a solution of the polymer obtained above in N,N-dimethylformamide and extruding the solution into a precipitating bath had a tenacity of 3 grams per denier, an extensibility of 19 percent, a sticking temperature of 220° C. and shrank only 7 percent in boiling water.

The fibers obtained by preparing a solution of a mechanical mixture of one part of the above polymer and one part of polyacrylonitrile and extruding the solution into a precipitating bath had a tenacity of 3.2 grams per denier, and extensibility of 21 percent, a sticking temperature of 220° C. and shrank only 6 percent in boiling water. The fibers contained 9.5 percent fumaramide by analysis.

Example No. 2

3 grams of an interpolymer of acrylonitrile and maleamide were dissolved in 100 cc. of water along with 0.1 gram of ammonium persulfate and 0.1 gram of potassium bisulfite. The resulting solution was tumbled end over end for 18 hours at 25° C. and 7 grams of acrylonitrile were then added and the polymerization allowed to continue for 48 hours at 25° C. The resulting polymeric material was precipitated by the addition of acetone and then collected by centrifuging. After drying, there was obtained 9.2 grams of polymeric material containing 19 percent by weight of maleamide.

The polymer can be mixed with polyacrylonitrile in all proportions and dissolved to give stable solutions which do not separate into distinct layers on standing and from which fibers and films of homogeneous character can be spun, extruded or cast.

Fibers spun by extruding a solution of the polymer in N,N-dimethylformamide into a precipitating bath had a tenacity of 3.2 grams per denier, an extensibility of 20 percent, a sticking temperature of 210° C. and shrank only 10 percent in boiling water. These fibers showed an excellent affinity for acetate direct, vat and acid dyes and did not stiffen or stick together in the dye bath.

Fibers obtained from a solution of a mechanical mixture of five parts polyacrylonitrile and 95 parts of the above polymer and extruding the solution in a precipitating bath had a tenacity of 3.2 grams per denier, and extensibility of 23 percent, a sticking temperature of 220° C. and shrank only 10 percent in boiling water.

Example No. 3

1 gram of poly methylfumaramate was added to 60 c.c. of water containing 1 cc. of 7-ethyl-2-methylundecane-4-sulfonic acid sodium salt (Tergitol No. 4). The mixture was then tumbled end over end for one hour at 50° C. The solution was cooled and 9.0 grams of acrylonitrile and .1 gram of ammonium persulfate and .1 gram of sodium bisulfite were added. The polymerization was effected by tumbling for 16 hours at 25° C. The polymer was obtained in an 85 percent yield and contained 10 percent by weight of methyl fumaramate.

Fibers spun by extruding a solution of this polymer in N,N-dimethylacetamide into a precipitating bath had a tenacity of 3.9 grams per denier, an extensibility of 17 percent, a sticking temperature of 210° C. and shrank only 7 percent in boiling water.

Fibers obtained from a solution of the mechanical mixture of five parts polyacrylonitrile and 95 parts of the above polymer and extruding the solution into a precipitating bath had a tenacity of 3.4 grams per denier, an extensibility of 18 percent, a sticking temperature of 220° C. and shrank only 6 percent in boiling water.

Example No. 4

3 grams of an interpolymer of N-methyl methyl maleamate and vinyl acetate containing 60 percent by weight of N-methyl methyl maleamate were dissolved in 50 cc. of a 50 percent solution of acetonitrile in water. There were then added 6 grams of acrylonitrile, .1 gram of ammonium persulfate and .1 gram of sodium bisulfite. The polymerization was effected by heating for 16 hours at 40° C. The precipitated polymer was obtained in a 72 percent yield and contained 29 percent by weight of the amide vinyl acetate interpolymer upon analysis.

Fibers spun by extruding the solution of the polymer in N,N-dimethylformamide into a precipitating bath had a tenacity of 3.3 grams per denier, an extensibility of 19 percent, a sticking temperature of 215° C. and shrank 8 percent in boiling water. Fibers showed an excellent affinity for acetate, direct, vat and acid dyes.

Fibers obtained from a solution of the mechanical mixture of 25 parts polyacrylonitrile and 75 parts of the above-described polymer and extruding the solution into a precipitating bath had a tenacity of 3.6 grams per denier, an extensibility of 19 percent, a sticking temperature of 220° C. and shrank only 6 percent in boiling water.

Example No. 5

2 grams of an interpolymer of N,N-dimethyl methyl itaconamate and acrylamide containing 30 percent by weight of the itaconamate were added to 70 cc. of water containing 0.1 gram of sodium bisulfite, 0.1 gram of ammonium persulfate and 9 grams of acrylonitrile. The resulting solution was then polymerized for 16 hours at 35° C. The polymer was filtered off and then dried. The polymer contained 17 percent by weight of the itaconamate acrylamide interpolymer on analysis.

Fibers spun by extruding the solution of this polymer in N,N-dimethylformamide into a precipitating bath had a softening point of 220° C. and showed excellent dye affinity.

Fibers obtained from a solution of the mechanical mixture of 10 parts polyacrylonitrile and 90 parts of the above polymer and extruding the solution into a precipitating bath had a tenacity of 3.1 grams per denier, an extensibility of 21 percent, a sticking temperature of 215° C. and shrank only 8 percent in boiling water.

Example No. 6

4 grams of poly-N,N-dimethyl ethyl citraconamate were dissolved in 75 cc. of acetonitrile containing 6.5 grams of acrylonitrile and 0.3 grams of benzoyl peroxide. The resulting solution was then heated for 24 hours at 50° C. and then cooled. The precipitated polymer was collected on a filter, washed and dried. It was found to contain 39 percent by weight of N,N-dimethyl ethyl citraconamate on analysis. Fibers obtained from this polymer had a sticking temperature of 195° C. and showed excellent dye affinity.

Example No. 7

3 grams of an interpolymer of N,N'-dimethylfumaramide and methyl methacrylate containing 28 percent by weight of the diamide were emulsified in 100 cc. of water containing 3 cc. of a sulfonated ether type of emulsifying agent. There was then added 7 grams of acrylonitrile, 0.15 gram of potassium persulfate and 0.1 gram of sodium bisulfite. The resulting emulsion was heated for 16 hours at 35° C., and then cooled to room temperature. The precipitated polymer was collected on a filter, washed and dried. It contained 28 percent by weight of the fumaramide methyl methacrylate interpolymer on analysis. Fibers obtained from this polymer product had a sticking temperature of 185° C.

The polymer can be mixed with polyacrylonitrile in all proportions and dissolved to give stable solutions which do not separate into distinct layers on standing and from which fibers and films of homogeneous character can be spun, extruded or cast.

Example No. 8

2 grams of poly N,N'-di-isopropyl maleamide were emulsified in 80 cc. of water containing 3 cc. of 7-methyl-2-methyl-undecane-4-sulfonic acid sodium salt (Tergitol No. 4). There were then added 8 grams of acrylonitrile, 0.1 gram of potassium persulfate and 0.1 gram of sodium bisulfite and the emulsion was heated at 35° C. for 16 hours with tumbling. The emulsion was then cooled to room temperature, the precipitated polymer filtered off, washed with distilled water and dried. It was found to contain 21 percent by weight of the maleamide. Fibers spun by extruding a solution of this polymer in N,N-dimethylacetamide into a precipitating bath had a tenacity of 3.8 grams per denier, an extensibility of 19 percent and shrank only 9 percent in boiling water. It had a sticking temperature of 220° C. and showed excellent affinity for dye.

The polymer can be mixed with polyacrylonitrile in all proportions and dissolved to give stable solutions which do not separate into distinct layers on standing and from which fibers and films of homogeneous character can be spun, extruded or cast.

Example No. 9

3 grams of an interpolymer of N-isopropyl normal butyl itaconamate and methyl acrylate containing 80 percent by weight of the itaconamate were dispersed in 100 cc. of water containing 3 cc. of 7-methyl-2-methyl-undecane-4-sulfonic acid sodium salt (Tergitol No. 4), 0.1 gram of potassium persulfate, 0.1 gram of sodium bisulfite and 7 grams of acrylonitrile. The resulting solution was then heated for 16 hours at 35° C. The solution was cooled to room temperature and the precipitated polymer filtered off, washed with distilled water and finally dried. It was obtained in an 88 percent yield and was found to contain 28 percent by weight of the itaconamate acrylate interpolymer on analysis. Fibers obtained from this polymer had a sticking temperature of 220° C.

The polymer can be mixed with polyacrylonitrile in all proportions and dissolved to give stable solutions which do not separate into distinct layers on standing and from which fibers and films of homogeneous character can be spun, extruded or cast.

Example No. 10

3 grams of poly N,N-dimethyl isopropyl citraconamate were dispersed in 100 cc. of water containing 3 cc. of 7-methyl-2-methylundecane-4-sulfonic acid sodium salt (Tergitol No. 4) to which 0.1 gram of ammonium persulfate, 0.1 gram of sodium bisulfite and 7 grams of acrylonitrile were added. The resulting solution was heated for 16 hours at 30° C., then cooled to room temperature. The precipitated polymer was filtered off, washed with distilled water and then dried. It was found to contain 29 percent by weight of citraconamate on analysis. Fibers were then spun from this product by extruding a solution thereof in N,N-dimethylformamide into a precipitating bath. The fibers thus obtained had a tenacity of 3.8 grams per denier, an extensibility of 20 percent, a sticking temperature of 210° C. and shrank only 8 percent in boiling water.

The polymer can be mixed with polyacrylonitrile in all proportions and dissolved to give stable solutions which do not separate into distinct layers on standing and from which fibers and films of homogeneous character can be spun, extruded or cast.

Example No. 11

9 grams of an interpolymer of N,N-dimethyl butyl itaconamate and N-ethyl isopropyl citraconamate containing 80 percent by weight of the itaconamate were emulsified in 80 cc. of water containing 3 cc. of 7-methyl-2-methylundecane-4-sulfonic acid sodium salt (Tergitol No. 4). There was then added 1 gram of acrylonitrile, .05 gram of potassium persulfate, .05 gram of sodium bisulfite and the emulsion was heated at 35° C. for 16 hours with tumbling. The emulsion was then cooled to room temperature, the precipitated polymer filtered off, washed with distilled water and dried. A solution of a mechanical mixture of 50 parts of polyacrylonitrile and 50 parts of the above polymer was cast to give a clear tough film.

Example No. 12

8 grams of an interpolymer of N-isopropyl ethyl fumaramate and N-methyl methyl itaconamate containing 80 percent by weight of the fumarate were emulsified in 80 cc. of water containing 3 cc. of 7-methyl-2-methyl-undecane-4-sulfonic acid sodium salt (Tergitol No. 4). There was then added 2 grams of acrylonitrile, .1 gram of ammonium persulfate and .1 gram of sodium bisulfite and the emulsion was heated at 35° C. for 12 hours with tumbling. The emulsion was then cooled to room temperature, the precipitated polymer filtered off, washed with distilled water and dried. It was found to contain 20 percent acrylonitrile by analysis.

Example No. 13

6 grams of an interpolymer of N-isopropyl methyl maleamate and N-methyl isopropyl citraconamate containing 70 percent by weight of the maleamate were emulsified in 100 cc. of water containing 4 cc. of 7-methyl-2-methylundecane-4-sulfonic acid sodium salt (Tergitol No. 4). There was then added 4 grams of acrylonitrile, 0.1 gram of sodium bisulfite, 0.1 gram of potassium persulfate and the emulsion was heated at 35° C. for 8 hours with tumbling. The emulsion was then cooled to room temperature, the precipitated polymer filtered off, washed with distilled water and dried. The polymer was found to contain 40 percent acrylonitrile by analysis.

Fibers obtained from a solution of a mechanical mixture containing 50 parts polyacrylonitrile and 50 parts of the above polymer and extruding the solution into a precipitating bath had a tenacity of 3.2 grams per denier, an extensibility of 23 percent, a sticking temperature of 215° C. and shrank only 7 percent in boiling water.

Example No. 14

3 grams of poly N-methyl methyl itaconamate were dispersed in 100 cc. of water containing 3 cc. of 7-methyl-2-methylundecane-4-sulfonic acid sodium salt (Tergitol No. 4), 0.1 gram of potassium persulfate, 0.1 gram of sodium bisulfite and 7 grams of acrylonitrile. The resulting emulsion was then heated for 12 hours at 35° C. The emulsion was cooled to room temperature and the precipitated polymer filtered off, washed and dried. It was obtained in a 94 percent yield and contained 29.5 percent by weight of N-methyl methyl itaconamate on analysis. Fibers obtained from this polymer had a sticking temperature of 215° C.

Example No. 15.

9 grams of poly N-methyl methyl maleamate were emulsified in 80 cc. of water containing 4 cc. of 7-methyl-2-methylundecane-4-sulfonic acid sodium salt (Tergitol No. 4). There was then added 1 gram of acrylonitrile, 0.05 gram of potassium persulfate, 0.05 gram of sodium bisulfite and the emulsion was heated at 35° C. for 16 hours with tumbling. The emulsion was then cooled to room temperature, the precipitated polymer filtered off, worked and dried. The polymer contained 89.5 percent by weight of N-methyl methyl maleamate on analysis. A solution of a mechanical mixture of 50 parts polyacrylonitrile and 50 parts of the above polymer was cast to give a clear tough film.

The preceding description and examples have set forth that the resinous compositions or polymers of the invention which contain from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention, including the mixtures of them with polyacrylonitrile in any proportions but preferably in the proportions of from 5 to 95 percent of one or more of the polymers of the invention and from 95 to 5 percent by weight of polyacrylonitrile, can be made up into solutions or dopes with one or more acrylonitrile polymer solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc. from the new resinous compositions or polymers of the invention, and mixtures thereof with polyacrylonitrile, include ethylene carbamate, ethylene carbonate, γ-butyrolactone, N-methyl-2-pyrrolidone, N,N-dimethyl methoxyacetamide, dimethyl cyanamide, N,N-dimethyl cyanoacetamide, N,N-dimethyl-β-cyanopropionamide, glycolonitrile (formaldehyde cyanohydren), malononitrile, ethylene cyanohydrin, dimethylsulfoxide, dimethyl sulfone, tetramethylene sulfone, tetramethylene sulfoxide, N-formylpyrrolidine, N-formyl morpholine, N,N'-tetramethylene methanephosphonamide, and the like. Generally speaking, we have found that N,N-dimethylformamide and N,N-dimethyl acetamide are particularly advantageous solvents. The amount of polymer in the solvent for best spinning conditions can vary from about 5 to 20 percent although higher concentrations are possible at prohibitively high temperatures for practical spinning operations.

What we claim is:

1. A process for preparing resinous compositions comprising heating in the presence of a polymerization catalyst an aqueous dispersion comprising from 5 to 95 percent by weight of acrylonitrile and from 95 to 5 percent by weight of an isolated polymer of an ester-amide group consisting of those represented by the following general formulas:

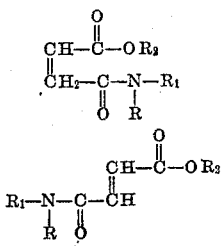

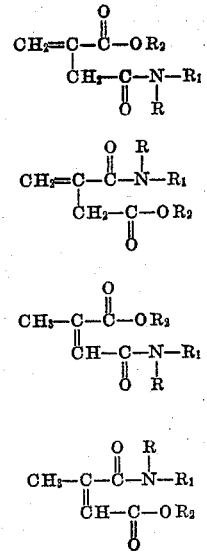

wherein R and $R_1$ each represents a member selected from the group consisting of a hydrogen atom and an alkyl group containing from 1 to 4 carbon atoms and $R_2$ represents an alkyl group containing from 1 to 4 carbon atoms, until a substantial amount of the acrylonitrile has been polymerized, and wherein the said acrylonitrile and the said isolated polymer are the sole copolymerizable components.

2. A process for preparing resinous compositions comprising heating in the presence of a peroxide polymerization catalyst an aqueous dispersion comprising from 5 to 95 percent by weight of acrylonitrile and from 95 to 5 percent by weight of an isolated poly N-methyl methyl maleamate, until a substantial amount of the acrylonitrile has been polymerized, wherein the said acrylonitrile and the said isolated poly N-methyl maleamate are the sole copolymerizable components.

3. A process for preparing resinous compositions comprising heating in the presence of a peroxide polymerization catalyst an aqueous dispersion comprising from 5 to 95 percent by weight of acrylonitrile and from 95 to 5 percent by weight of isolated polymethyl fumaramate, until a substantial amount of the acrylonitrile has been polymerized, wherein the said acrylonitrile and the said isolated polymethyl fumaramate are the sole copolymerizable components.

4. A process for preparing resinous compositions comprising heating in the presence of a peroxide polymerization catalyst an aqueous dispersion comprising from 5 to 95 percent by weight of acrylonitrile and from 95 to 5 percent by weight of isolated poly N-methyl methyl itaconamate, until a substantial amount of the acrylonitrile has been polymerized, wherein the said acrylonitrile and the said isolated poly N-methyl methyl itaconamate are the sole copolymerizable components.

5. A process for preparing resinous compositions comprising heating in the presence of a peroxide polymerization catalyst an aqueous dispersion comprising from 5 to 95 percent by weight of acrylonitrile and from 95 to 5 percent by weight of isolated poly N,N-dimethyl isopropyl citraconamate, until a substantial amount of the acrylonitrile has been polymerized, wherein the said acrylonitrile and the said isolated poly N,N-dimethyl isopropyl citraconamate are the sole copolymerizable components.

6. A process for preparing resinous compositions comprising heating in the presence of a peroxide polymerization catalyst an aqueous dispersion comprising from 5 to 95 percent by weight of acrylonitrile and from 95 to 5 percent by weight of an isolated interpolymer, the said interpolymer consisting of from 5 to 95 percent by weight of N-methyl methyl maleamate and from 95 to 5 percent by weight of vinyl acetate, until a substantial amount of acrylonitrile has been polymerized, and wherein the said acrylonitrile and the said isolated interpolymer are the sole copolymerizable components.

7. A process for preparing resinous compositions comprising heating in the presence of a polymerization catalyst an aqueous dispersion comprising from 5 to 95 percent by weight of acrylonitrile and from 95 to 5 percent by weight of an isolated homopolymer of an alkyl maleamate of not more than 16 carbon atoms wherein the said alkyl group contains from 1 to 4 carbon atoms and, containing no substituent groups other than N-alkyl groups of from 1 to 4 carbon atoms, until a substantial amount of the acrylonitrile has been polymerized, and wherein the said acrylonitrile and the said isolated homopolymer are the sole copolymerizable components.

8. A process for preparing resinous compositions comprising heating in the presence of a polymerization catalyst an aqueous dispersion comprising from 5 to 95 percent by weight of acrylonitrile and from 95 to 5 percent by weight of an isolated homopolymer of an alkyl fumaramate of not more than 16 carbon atoms wherein the said alkyl group contains from 1 to 4 carbon atoms and containing no substituent groups other than N-alkyl groups of from 1 to 4 carbon atoms, until a substantial amount of the acrylonitrile has been polymerized, and wherein the said acrylonitrile and the said isolated homopolymer are the sole copolymerizable components.

9. A process for preparing resinous compositions comprising heating in the presence of a polymerization catalyst an aqueous dispersion comprising from 5 to 95 percent by weight of acrylonitrile and from 95 to 5 percent by weight of an isolated homopolymer of an alkyl itaconamate of not more than 17 carbon atoms wherein the said alkyl group contains from 1 to 4 carbon atoms and containing no substituent other than N-alkyl groups of from 1 to 4 carbon atoms, until a substantial amount of the acrylonitrile has been polymerized, and wherein the said acrylonitrile and the said isolated homopolymer are the sole copolymerizable components.

10. A process for preparing resinous compositions comprising heating in the presence of a polymerization catalyst an aqueous dispersion comprising from 5 to 95 percent by weight of acrylonitrile and from 95 to 5 percent by weight of an isolated homopolymer of an alkyl citraconamate of not more than 17 carbon atoms wherein the said alkyl group contains from 1 to 4 carbon atoms and containing no substituent other than N-alkyl groups of from 1 to 4 carbon atoms, until a substantial amount of the acrylonitrile has been polymerized, and wherein the said acrylonitrile and the said isolated homopolymer are the sole copolymerizable components.

11. A modified resinous polymer containing from 5 to 95 percent by weight of acrylonitrile and having the structure and composition of a polymer prepared in accordance with the process of claim 1.

12. A modified resinous polymer containing from 5 to 95 percent by weight of acrylonitrile and having the structure and composition of a polymer obtained in accordance with the process of claim 2.

13. A modified resinous polymer containing from 5 to 95 percent by weight of acrylonitrile and having the structure and composition of a polymer obtained by the process of claim 3.

14. A modified resinous polymer containing from 5 to 95 percent by weight of acrylonitrile and having the structure and composition of a polymer obtained by the process of claim 4.

15. A modified resinous polymer containing from 5 to 95 percent by weight of acrylonitrile and having the structure and composition of a polymer obtained by the process of claim 5.

16. A modified resinous polymer containing from 5 to 95 percent by weight of acrylonitrile and having the structure and composition of a polymer obtained by the process of claim 6.

References Cited in the file of this patent

UNITED STATES PATENTS

| | | |
|---|---|---|
| 2,168,535 | Nuesslein et al. | Aug. 8, 1939 |
| 2,486,370 | Kenyon et al. | Oct. 25, 1949 |
| 2,620,324 | Coover et al. | Dec. 2, 1952 |